(12) United States Patent
Kothari et al.

(10) Patent No.: US 7,908,363 B2
(45) Date of Patent: Mar. 15, 2011

(54) CALL LIMITER FOR WEB SERVICES

(75) Inventors: Pankaj Kothari, Bangalore (IN); Sidharta Secthana, Bangalore (IN); Amit Kumar, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 308 days.

(21) Appl. No.: 11/951,138

(22) Filed: Dec. 5, 2007

(65) Prior Publication Data

US 2009/0106821 A1 Apr. 23, 2009

(51) Int. Cl.
*G06F 15/173* (2006.01)
*G06F 15/16* (2006.01)
(52) U.S. Cl. .................. 709/224; 709/219; 709/226
(58) Field of Classification Search .................. None
See application file for complete search history.

(56) References Cited

U.S. PATENT DOCUMENTS

| 6,578,068 | B1 * | 6/2003 | Bowman-Amuah | 709/203 |
| 7,231,445 | B1 | 6/2007 | Aweya et al. | |
| 7,466,810 | B1 * | 12/2008 | Quon et al. | 379/201.01 |
| 2003/0110242 | A1 * | 6/2003 | Brown et al. | 709/222 |
| 2003/0144894 | A1 * | 7/2003 | Robertson et al. | 705/8 |
| 2004/0111506 | A1 * | 6/2004 | Kundu et al. | 709/223 |
| 2005/0198200 | A1 * | 9/2005 | Subramanian et al. | 709/218 |
| 2006/0217106 | A1 * | 9/2006 | Davidson et al. | 455/405 |
| 2007/0233820 | A1 * | 10/2007 | Schneider | 709/220 |

* cited by examiner

*Primary Examiner* — John B. Walsh
(74) *Attorney, Agent, or Firm* — Berkeley Law & Technology Group, LLP

(57) ABSTRACT

Embodiments of methods, apparatuses, devices and systems associated with web services are disclosed. In a particular implementation, web services calls from one or more subscribers to a first server location may be tracked. One or more other server locations may be contacted to determine whether additional web services calls for the at least one of the one or more subscribers are available in response to at least one of the one or more subscribers reaching an established subscriber limit.

22 Claims, 4 Drawing Sheets

CALL LIMITER FOR WEB SERVICES

FIELD

Embodiments of the invention relate to the field of web services, and more specifically to limiting Web services calls at one or more server locations.

BACKGROUND

In the field of web services it may be desirable to limit access to the web services based on contractual terms with one or more web-services subscribers. In addition, under some circumstances, it may be desirable to deliver web services from servers and/or data centers having one or more locations.

BRIEF DESCRIPTION OF DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

DETAILED DESCRIPTION

Figure 1:
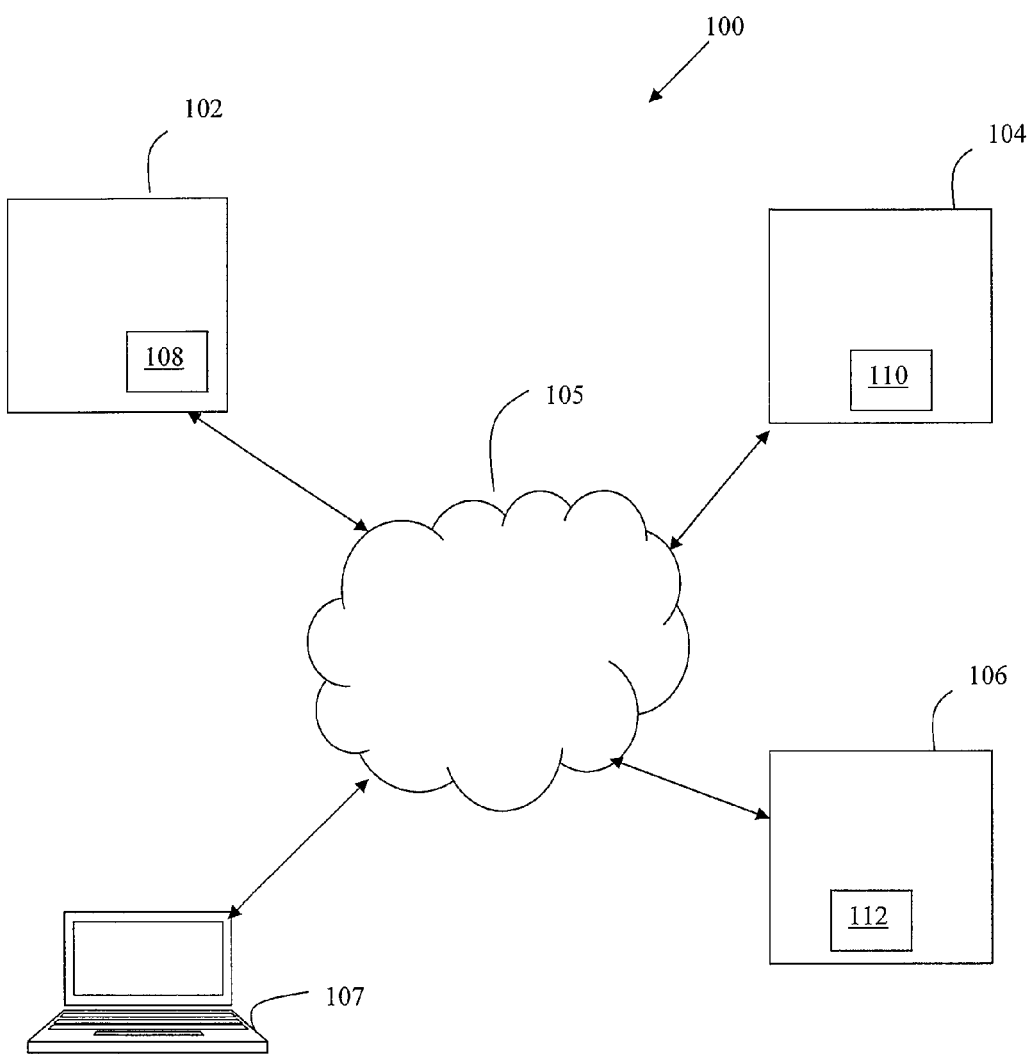
FIG. 1 is a schematic diagram of an embodiment, such as one or more server locations.

In the following detailed description, numerous specific details are set forth to provide a thorough understanding of the claimed subject matter. However, it will be understood by those skilled in the art that the claimed subject matter may be practiced without these specific details. In other instances, methods, procedures, components and/or circuits that would be known by one of ordinary skill have not been described in detail so as not to obscure the claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" and/or "an embodiment" in various places throughout this specification are not necessarily intended to refer to the same embodiment or to any one particular embodiment described. Furthermore, it is to be understood that particular features, structures, and/or characteristics described may be combined in various ways in one or more embodiments. In general, of course, these and other issues may vary with the particular context. Therefore, the particular context of the description and the usage of these terms may provide helpful guidance regarding inferences to be drawn for that particular context.

Likewise, the terms, "and," "or," and "and/or" as used herein may include a variety of meanings that will depend at least in part upon the context in which it is used. Typically, "and/or" if used to associate a list, such as A, B and/or C, is intended to mean A, B, or C as well as A, B and C. Though, it should be noted that this is merely an illustrative example and claimed subject matter is not limited to this example.

Unless specifically stated otherwise, throughout this specification, terms such as "processing," "computing," "calculating," "selecting," "forming," "enabling," "inhibiting," "identifying," "initiating," "querying," "obtaining," "hosting," "maintaining," "representing," "modifying," "receiving," "transmitting," "storing," "authenticating," "authorizing," "hosting," "determining" and/or the like refer to actions and/or processes that may be performed by a system, such as a computer and/or other computing platform, capable of manipulating and/or transforming data which may be represented as electronic, magnetic and/or other physical quantities within the system's processors, memories, registers, and/or other information storage, transmission, reception and/or display devices. Accordingly, a computing platform refers to a system or a device that includes the ability to process and/or store data in the form of signals or electronic data. Thus, a computing platform, in this context, may comprise hardware, software, firmware and/or any combination thereof. Further, unless specifically stated otherwise, a process as described herein, with reference to flow diagrams or otherwise, may also be executed and/or controlled, in whole or in part, by a computing platform.

In the field of web services it may, under some circumstances, be desirable to use distributed data centers, or server locations, to process client requests for web services. For example, it may be desirable to have server locations in one or more geographic regions. Furthermore, clients and/or subscribers may agree to one or more contractual terms for web services. However, with distributed data centers it may be difficult to limit a subscriber to the agreed upon terms for the web services. For example, for a web service delivered by several possible server locations, it may be difficult to limit the subscriber appropriately because some service requests may be processed by different server locations.

FIG. 1 depicts a schematic diagram of a system 100 in accordance with an embodiment. With reference to FIG. 1, system 100 may comprise one or more server locations, such as server locations 102, 104, and/or 106. As used herein, the term "server location" may mean a logical and/or physical location of one or more servers organized into one or more groups. As used herein the term "server" refers to a computing platform or computer operable to provide a service to one or more other computing platforms or computers via a network. These services may include access to data and/or access to one or more software applications. For example, in this embodiment, the various server locations may comprise geographically distinct data centers, which may under some circumstances be referred to as co-located data centers, or colos. In this embodiment, a server location may comprise one or more servers operable to perform one or more data center functions, such as process and/or respond to one or more web services calls, such as one or more Application Program Interface (API) calls, from one or more clients, such as client 107, for example. A "Web service" as used herein relates to a method of integrating applications using an Internet protocol (IP) infrastructure. In particular examples of a Web service, although claimed subject matter is not limited in these respects, standard protocols may be employed to transmit data objects among components over an Internet protocol such as, for example, HTTP, HTTPS, XML, REST, SOAP, WSDL and/or UDDI standards. Here, XML may be used to tag data objects, SOAP may be used to transfer data objects, WSDL may be used to describe available services and UDDI may be used to list available services. However, these are merely examples of protocols that may enable a Web service and claimed subject matter is not limited in these respects. In one particular embodiment, although claimed subject matter is not limited in these respects, a Web service may allow independently created and implemented applications from different network sources to communicate with one another. In another example, a Web service may comprise a "remote service" that is capable of communicating with one or more components of an application over a data link. Though, it should be noted that these are merely illustrative examples relating to web services and that claimed subject matter is not limited in this regard.

In this embodiment, client 107 may be associated with various subscribers or subscription based web services, for example. Examples of web services may include, but are in no way limited to, web searches, stock quotes, and/or other web based applications. For example, a web search web services provider may limit a subscriber to a determined number of API call per day. Likewise, a stock quotes web services may license their content via a web service and may limit a licensee to a determined number of calls per day. In an embodiment, client 107 may initiate one or more web services calls via a network 105, which, may be directed to one of server locations 102, 104, and/or 106. In this embodiment, the web service calls may be directed to a particular one of the server locations, based on a number of factors including, type of service request, geographic relationship between client 107 and the server locations, downtime for one of the server locations, and/or current resources available at the different server locations to name but a few examples. U.S. Pat. No. 7,231,445 shows one example technique for distributing web service requests. Though, it should be noted that these are merely illustrative examples relating to web services requests and that claimed subject matter is not limited in this regard.

In this embodiment, the server locations may also comprise a rate limiter, such as rate limiter 108 of server location 102, for example. As user herein, a rate limiter may mean a hardware, firmware, or software component operable to monitor web services calls at least in part to prevent subscribers from exceeding an agreed upon limit to their web services usage. For example, a subscriber may agree to limits on their use of one or more web services. These limits may include a limited amount of data transfer during one or more time periods, a limited number of API calls during one or more time periods, limits to access during certain parts of the day, a specific service level limit, such as a data transfer rate limit or and API call rate limit, and/or a prepaid limit to the amount of data and/or API calls, to name but a few examples. In this embodiment, each of server locations 102, 104, and/or 106 may include a rate limiter along a service request pipeline associated with that server location. For example, a rate limiter may be implemented as a server plug-in module for server 110 at server location 104. In this example, the server plug-in module at server 110 may be operable to receive web services calls directed to server location 104 and may be further operable to communicate with one or more plug-ins at various servers associated with server location 104. In addition, a rate limiter may be implemented as a separate server 112 at server location 106. In this example, server 112 may be operable to receive web services calls directed to server location 106. In further addition, a rate limiter may be implemented as a software program on a computing platform providing web services. In further addition, rate limiter 108 may be implemented as a combination of the previously discussed implementations. In addition, communication between the rate limiters and the server locations may be asynchronous and/or synchronous. It should, however, be noted that these are merely illustrative examples of a rate limiter and that claimed subject matter is not limited in this regards.

Regardless of the implementation details of rate limiter 108, rate limiter 108 may be operable to enforce a server location specific web services call limit on a per subscriber, client, or customer basis. For example, rate limiter 108 may, under some circumstances, be configured to receive or intercept one or more web services requests, such as API calls, directed to one of the server locations, such as server location 102. For example, rate limiter 108 may be placed in one or more positions along a web services call processing pipeline, such that rate limiter 108 may be operable to interact with a web services call prior to that call being processed by a server. In this embodiment, rate limiter 108 may extract a client or subscriber ID from the web services request. Rate limiter 108 may further keep track of the web services requests associated with particular subscribers, such as client 107, for example. For example, rate limiter 108 may include a web services call limit associated with client 107, such as a subscriber limit, and, if a web services call is received from client 107 then rate limiter 108 may decrement a counter corresponding to the subscriber limit. As used herein, the terms "call limit" and/or "subscriber limit" may mean a contractual or agreed upon limit for service requests within a specified time period, such as a limit on the number of service requests or API calls within a day, an hour, or a month, for example. In this embodiment, rate limiter 108 may keep a real time record of how many web services calls may remain for client 107. Alternatively, rate limiter 108 may keep a real time record of how many web services calls have been received from client 107 and check that number against a subscriber limit before allowing the web services call to be processed by server location 102, for example. It should be noted that these are merely illustrative examples relating to a call limiter and that claimed subject matter is not limited in this regard.

Figure 2:
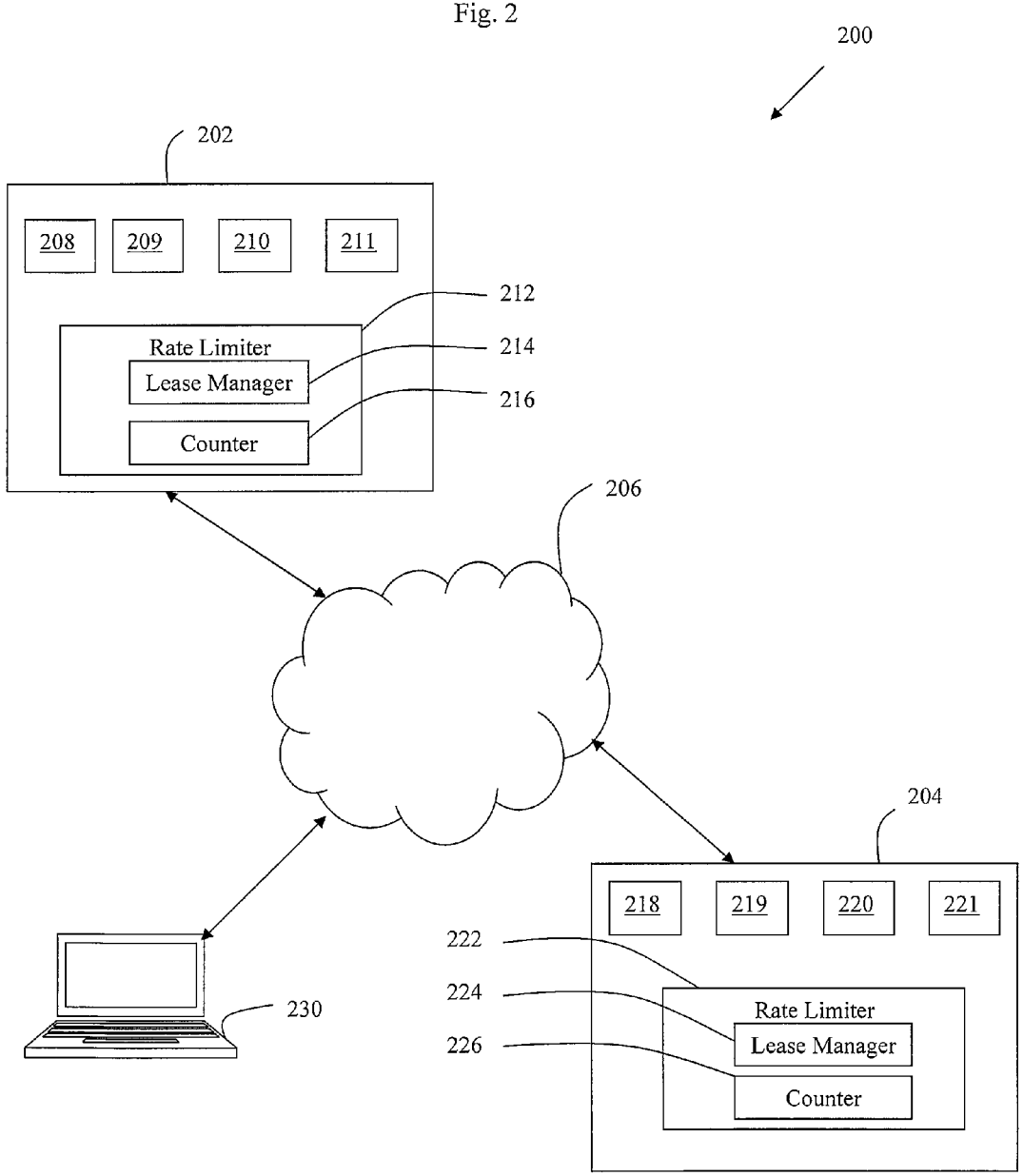
FIG. 2 is a schematic diagram of an embodiment, such as one or more server locations including call limiters.

FIG. 2 is a schematic diagram depicting one or more interactions among server locations in accordance with an embodiment. With regard to FIG. 2, an embodiment 200 may comprise server locations 202 and 204 which may, under some circumstances, communicate via network 206. In this embodiment, server location 202 may comprise one or more servers, such as servers 208, 209, 210, and/or 211, for example. In an embodiment, server location 202 may further comprise a rate limiter 212. In this embodiment, rate limiter 212 may comprise a lease manager 214 and/or a counter 216, for example. Likewise, server location 204 may comprises one or more servers, such as servers 218, 219, 220, and/or 221, for example. In an embodiment, server location 204 may further comprise a rate limiter 222. In this embodiment, rate limiter 222 may comprise a lease manager 224 and/or a counter 226, for example With regard to FIG. 2, if server location 202 receives a web services call from client 230, rate limiter 212 may, under some circumstances intercept the web services call. Rate limiter 212 may then determine an identity or subscriber associated with client 230 at least in part to determine whether client 230 has web services calls remaining at server location 202, for example. In this embodiment, rate limiter 212 may use counter 216 to determine whether any web services calls remain for client 230. If web services calls remain available for client 230, then rate limiter 212 may allow the web services call to be processed by one of servers 208-211, for example. If, however, there are no web services calls available for client 230 at server location 202, then rate limiter 212 may use lease manager 214 to attempt to lease additional web services calls from another server location, such as server location 204, for example. In this embodiment, rate limiter 212 may send a message to server location 204 to determine whether additional web services calls are available for client 230 at server location 204. Server location 204 may pass this message to rate limiter 222. In this embodiment, rate limiter 222 may then use lease manager 224 and/or counter 226 to determine if web services calls for client 230 are available. If web services calls for client 230 are available, then server location 204 may inform server location 202 that web services calls are available. In response, rate limiter 212 and/or lease manager 214 may request to lease additional web service calls from server location 204. If the request is accepted by server location 204, then lease manager 224 may subtract the leased web services calls from counter 226, while lease manager 214 may add the leased web services calls to counter 216, for example. After completing the lease transaction with server location 204, rate limiter 212 may allow the web services call from client 230 to be processed by one of servers 208-211, and decrement the updated subscriber limit. Likewise, under some circumstances, server location 204 may attempt to lease web services calls from server location 202 at least in part to process web service calls from a client, such as client 230, for example. Though, it should be noted that these are merely illustrative examples of a rate limiter and that claimed subject matter is not limited in these regards.

Figure 3:
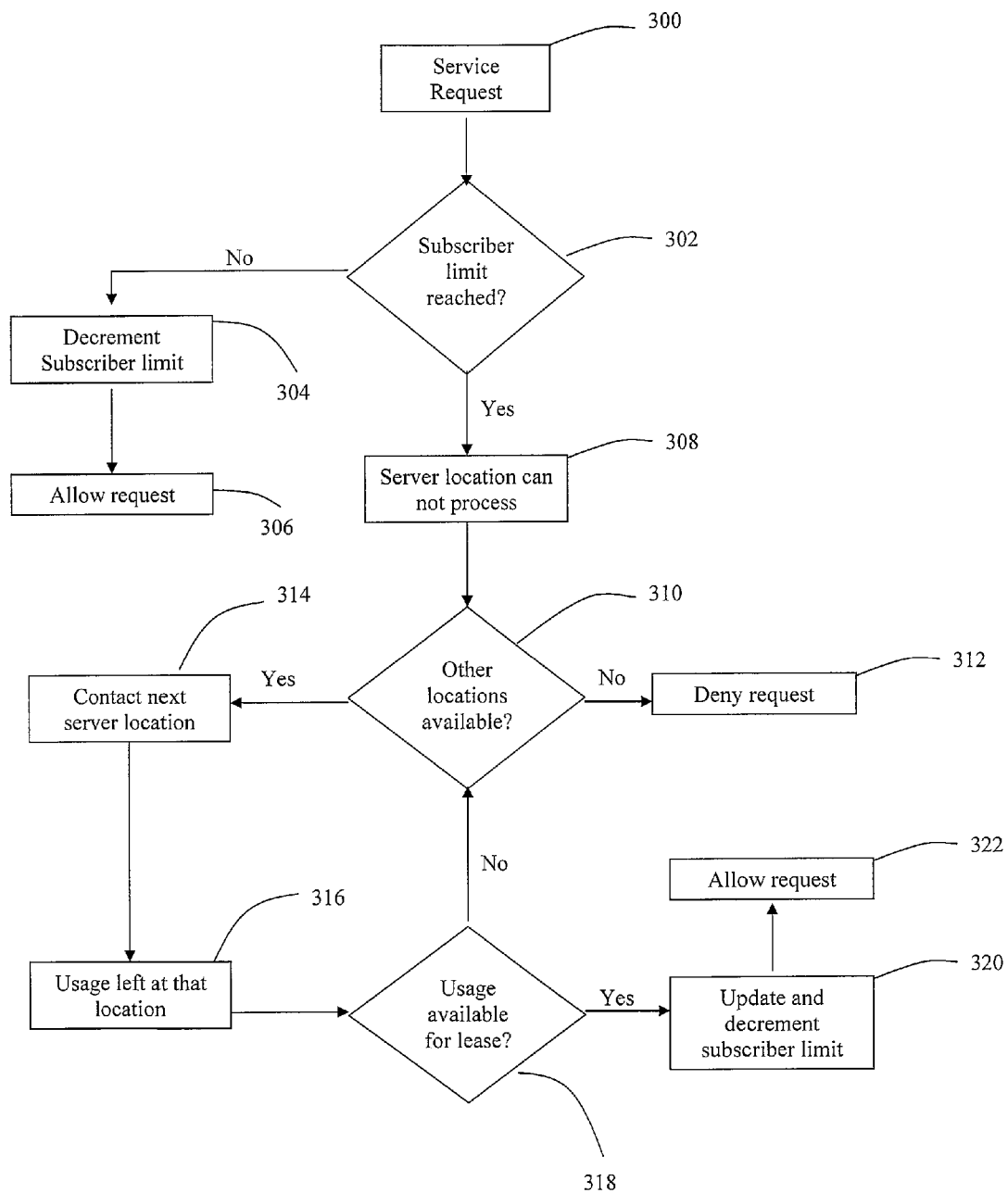
FIG. 3 is a flowchart of a method in accordance with an embodiment.

FIG. 3, comprises a flowchart of a method in accordance with an embodiment. With regard to box 300, a server location may receive a web services request, such as from a client as discussed above. With regard to box 302, the server location may determine whether the client has reached a subscriber limit associated with the web services request. If the server location determines that the subscriber limit has not been reached then at box 304, the server location may decrement the subscriber limit and at box 306 allow the web services request to be processed. If, however, the server location determines that the subscriber limit has been reached, then at box 308 the server location will not be able to process the web services request unless it is able to lease additional web service requests from another server location. Accordingly, at box 310, the server location may determine whether other server locations are available to lease requests from. If no other server locations are available, then at box 312 the server location denies the web services request. For example, the other server locations may have already been contacted and indicated that they did not have any calls available for lease, in which case the server location would deny the web services request. Though, again, it should be noted that these are merely illustrative examples of a method of processing a web service request and that claimed subject matter is not limited in this regard.

If, however, there are other server locations available, then at box 314, the server location will attempt to contact the next server location on a list of server locations. For example, the server location may include a list of all other server locations operable to process certain types of web services requests from particular clients. The server may then contact the next server location on the list whenever it has reached a subscriber limit for a particular client and attempt to lease additional web services calls for that client. For example, at box 316 the next server location will provide the first server location with information detailing the number of subscriber calls left for the client at that location. With regard to box 318, the server location will determine, based on the response received from the contacted other server location, whether additional usage is available for lease. If not, then server location will return to box 310 and attempt to contact a next server location on the list. If no additional server locations are available, then the server location will deny the request. If however, usage is available for lease, then the server location will proceed to box 320, and update the subscriber limit to include the leased usage and decrement the subscriber limit to reflect the current web services request. The server location will then proceed to box 322 and allow the web services request to be processed. Though, again, these are merely illustrative examples of leasing additional webs service requests and claimed subject matter is not limited in this regard.

Figure 4:
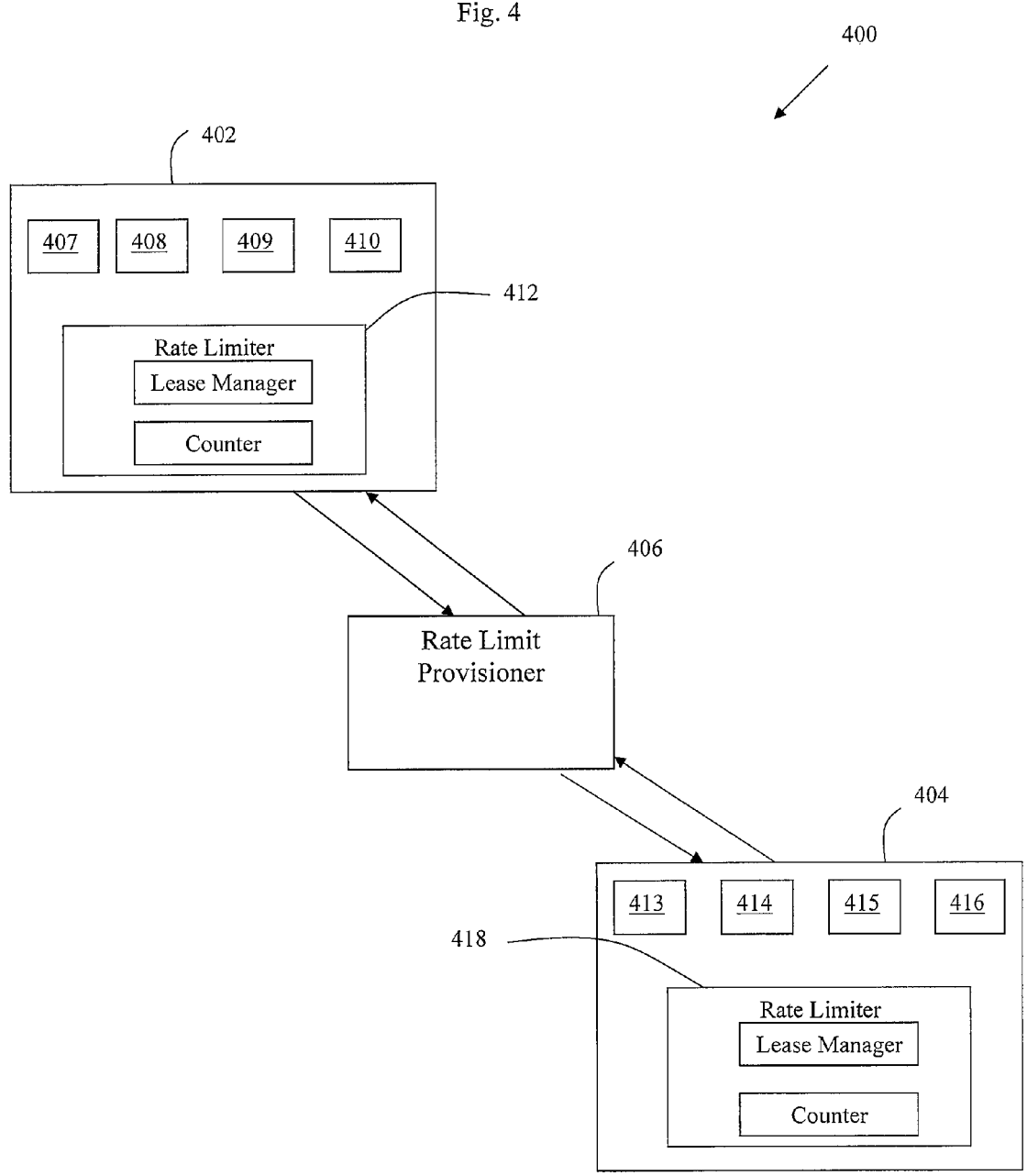
FIG. 4 is a schematic diagram of an embodiment, including a rate limit provisioner.

FIG. 4 is a schematic diagram of a system 400 in accordance with an embodiment. With regard to FIG. 4, system 400 may comprise a server location 402, a server location 404, and/or a rate limit provisioner 406. Server location 402 may comprise servers 407, 408, 409, and/or 410, along with a rate limiter 412, for example. Likewise server location 404 may comprise servers 413, 414, 415, and/or 416, along with a rate limiter 418. In this embodiment, rate limit provisioner 406 may comprise a computing platform operable to communicate with server locations 402 and/or 404 and/or rate limiters 412 and/or 418. For example, rate limit provisioner 406 may be operable to communicate with the server locations to set an initial subscriber limit for each of the server locations. As just one example, the initial subscriber limit may comprise an equal portion of a subscriber's contractually agreed web service calls. In this example, that would mean each server location would initially be assigned one-half of a client's web service requests for a determined period of time. Alternatively, if more than two server locations were involved the initial subscriber limits could still be equally divided among the various server locations. In addition, rate limit provisioner 406 may set the initial subscriber limits based on one or more preferences determined by the subscriber. Though, it should be noted that these are merely illustrative examples of determining an initial subscriber limit and that claimed subject matter is not limited in this regard.

In addition, rate limit provisioner 406 may adapt a distribution of a particular client's web services calls based on one or more learned aspects of that particular client. In the above example, rate limit provisioner 406 may determine over time that a higher percentage of web service calls are processed by server location 402 than by server location 404. This difference could be due to any number of factors, including geographic proximity of the client to the two server locations, differences in capacity at the two server locations, differences in demands placed upon the two server locations by other clients or subscribers, to name but a few factors. In this embodiment, rate limit provisioner 406 may, when distributing subsequent initial call limits for a particular client, take into account such learned characteristics of the particular client when determining an initial distribution. In the above example, rate limit provisioner 406 may distribute the overall subscriber limit for a particular client so that each of server locations 402 and 404 have an initial limit that is proportional to the historic percentage of calls handled by each server location for that particular client. Though, again, it should be noted that these are merely illustrative examples of distributing an initial subscriber limit and that claimed subject matter is not limited in this regard.

In the preceding description, various aspects of claimed subject matter have been described. For purposes of explanation, specific numbers, systems and/or configurations were set forth to provide a thorough understanding of the claimed subject matter. However, it should be apparent to one skilled in the art having the benefit of this disclosure that claimed subject matter may be practiced without the specific details. In other instances, features that would be understood by one or ordinary skill were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method comprising:
  tracking, by a first server location comprising at least one computing platform comprising at least one processor, web services calls from one or more subscribers to the first server location;
  determining, by the first server location, whether at least one of the one or more subscribers has reached a subscriber limit for the web services calls processed by the first server location, the subscriber limit comprising a threshold number of web services calls; and
  contacting one or more other server locations via an electronic network to determine whether additional web services calls for the at least one of the one or more subscribers are available in response to the at least one of the one or more subscribers reaching the subscriber limit for the web services calls processed by the first server location; and
  leasing, by the first server location, one or more additional web services calls from one or more of the other server locations in response to an availability of additional web services calls by the one or more other server locations, wherein in response to the leasing, the subscriber limit is increased to process the one or more additional web services calls by the first server location.

2. The method of claim 1, and further comprising:
  in response to a request from a second computing platform, leasing, by the first server location, additional web services calls to a second server location, if said subscriber limit associated with one of the subscribers has not been reached for said first server location.

3. The method of claim 1, and further comprising:
  contacting, by the server location, at least one successive other server location of the one or more other server locations to determine whether additional web services calls are available for that subscriber in response to an unavailability of additional web services calls at a contacted one of the one or more other server locations.

4. The method of claim 1, wherein said subscriber limit comprises the threshold number web services calls for the one or more subscribers to be processed by the first server location.

5. The method of claim 1, wherein an order for contacting the other server locations is determined based at least in part on one or more prior contacts with the other server locations.

6. The method of claim 1, wherein said subscriber limit is based at least in part on a distribution of prior web services calls from a particular subscriber to the server locations and/or one or more subscriber preferences.

7. An article comprising: one or more memories having instructions stored thereon which are executable by a processor to:
  track web services calls from one or more subscribers to a first server location;
  determine whether at least one of the one or more subscribers has reached a subscriber limit for the web services calls processed by the first server location, the subscriber limit comprising a threshold number of web services calls;
  contact one or more other server locations via an electronic network to determine whether additional web services calls for the at least one of the one or more subscribers are available in response to the at least one of the one or more subscribers reaching the subscriber limit for the web services calls processed by the first server location; and
  lease one or more additional web services calls from one or more of the other server locations in response to an availability of additional web services calls by the one or more other server locations, wherein in response to the leasing, the subscriber limit is increased to process the one or more additional web services calls by the first server location.

8. The article of claim 7, wherein said instructions are further executable to:
  contact at least one successive other server location of the one or more other server locations to determine whether additional web services calls are available for that subscriber in response to an unavailability of additional web services calls at a contacted one of the one or more other server locations.

9. The article of claim 7, wherein said subscriber limit comprises a portion of a total limit of web services calls for one or more subscribers.

10. The article of claim 7, wherein an order for contacting the other server locations is determined based at least in part on one or more prior contacts with the other server locations.

11. The article of claim 7, wherein said subscriber limit is based at least in part on a distribution of prior web services calls from a particular subscriber to the server locations and/or one or more subscriber preferences.

12. The article of claim 7, wherein said instructions are further executable to:
  in response to a request from a second computing platform, lease additional web services calls to a second server location, if said subscriber limit associated with one of the subscribers has not been reached for said first server location.

13. An apparatus comprising:
  a computing platform comprising at least one processor to track web services calls from one or more subscribers to a first server location;
  said computing platform further to determine whether at least one of said one or more subscribers has reached a call limit for the web services calls associated with said first server location, the call limit comprising a threshold number of web services calls;
  said computing platform further to contact another computing platform via an electronic network to attempt to lease additional web services calls from another server location for said one of said one or more subscribers in response to one of said subscribers reaching said call limit for the web services calls; and
  said computing platform further to increase the call limit to process the additional web services calls by the first server location in response to a successful attempt to lease the additional web services calls.

14. The apparatus of claim 13, said at least one processor further to lease one or more additional web services calls from the contacted computing platform in response to an availability of additional web services calls at the contacted computing platform.

15. The apparatus of claim 13, said at least one processor further to contact at least one successive other computing platform to attempt to lease additional web services calls from other server locations in response to an unavailability of additional web services calls at the contacted computing platform.

16. The apparatus of claim 13, wherein said call limit comprises a portion of a total limit of web services calls for one or more subscribers.

17. The apparatus of claim 13, wherein said call limit is based at least in part on a distribution of prior web services calls from a particular subscriber to the server locations and/or one or more subscriber preferences.

18. The apparatus of claim 13, said at least one processor further to lease additional web services calls to a second computing platform, in response to a request from said second computing platform, and in response to said call limit associated with one of the subscribers not having been reached for said computing platform.

19. A system comprising:
- means for processing one or more web services calls comprising a first server location including at least one computing platform comprising at least one processor;
- means for tracking a number of web services calls to said means for processing from one or more subscribers;
- means for determining whether at least one of the one or more subscribers has reached a subscriber limit for the web services calls processed by the first server location, the subscriber limit comprising a threshold number of web services calls; and
- means for contacting other server locations via an electronic network in response to the at least one of the subscribers reaching the subscriber limit for the web services calls processed by the first server location;
- means for leasing one or more additional web services calls from one or more of the other server locations in response to an availability of additional web services calls by the one or more other server locations, wherein in response to the leasing, the subscriber limit is increased to process the one or more additional web services calls by the first server location.

20. The system of claim 19, wherein said subscriber limit comprises a portion of a total limit of web services calls for one or more subscribers.

21. The system of claim 19, and further comprising:
- means for determining said subscriber limit, based at least in part on a distribution of prior web services calls from a particular subscriber to the server locations and/or one or more subscriber preferences.

22. The system of claim 19, and further comprising:
- means for leasing one or more web services calls to one of said other server locations in response to a request from said second server location, and in response to a subscriber not having reached said subscriber limit at said means for processing.

* * * * *